March 6, 1928.  1,661,976
J. N. STOVALL
HARVESTING MACHINE
Filed Feb. 21, 1927   5 Sheets-Sheet 1

INVENTOR.
J. N. Stovall
BY
Geo. P. Kimmel
ATTORNEY.

March 6, 1928.  
J. N. STOVALL  
HARVESTING MACHINE  
Filed Feb. 21, 1927

INVENTOR.  
J. N. Stovall  
Geo. P. Kimmel  
ATTORNEY.

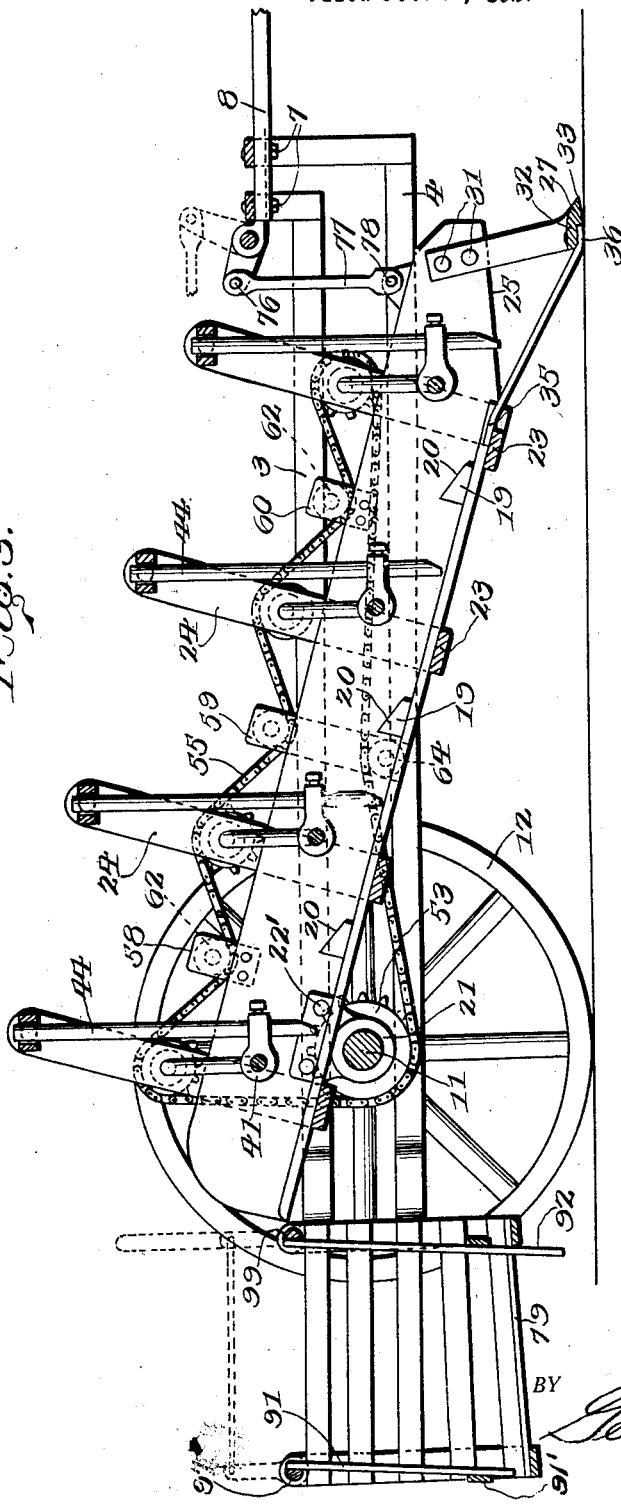

March 6, 1928.
J. N. STOVALL
HARVESTING MACHINE
Filed Feb. 21, 1927
1,661,976
5 Sheets-Sheet 4
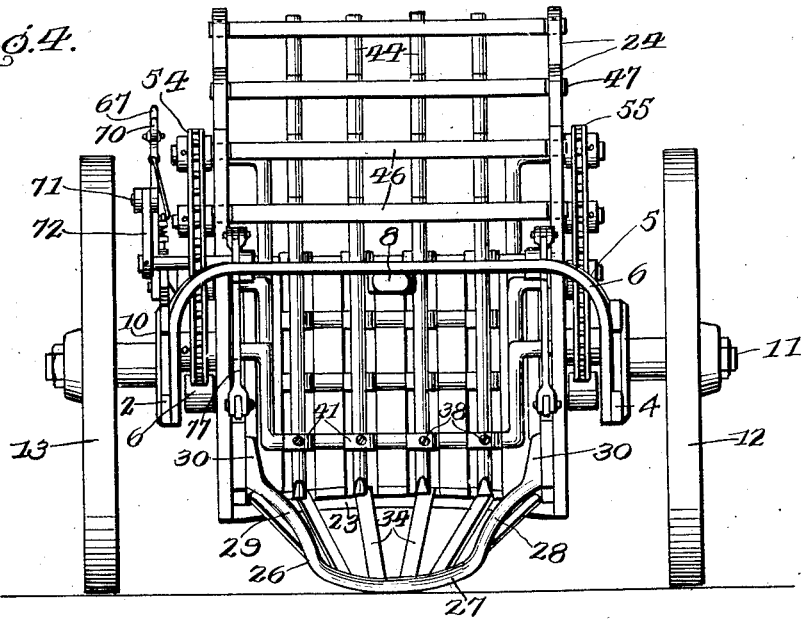
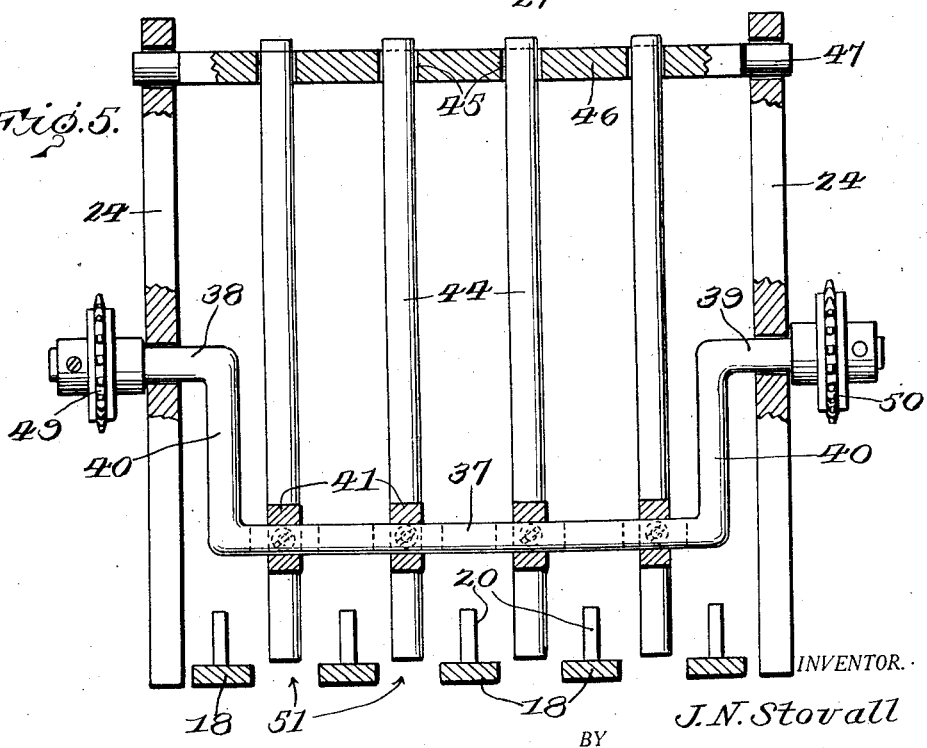
INVENTOR.
J. N. Stovall
BY
Geo. F. Kimmel ATTORNEY.

March 6, 1928.  
J. N. STOVALL  
HARVESTING MACHINE  
Filed Feb. 21, 1927  
1,661,976  
5 Sheets-Sheet 5
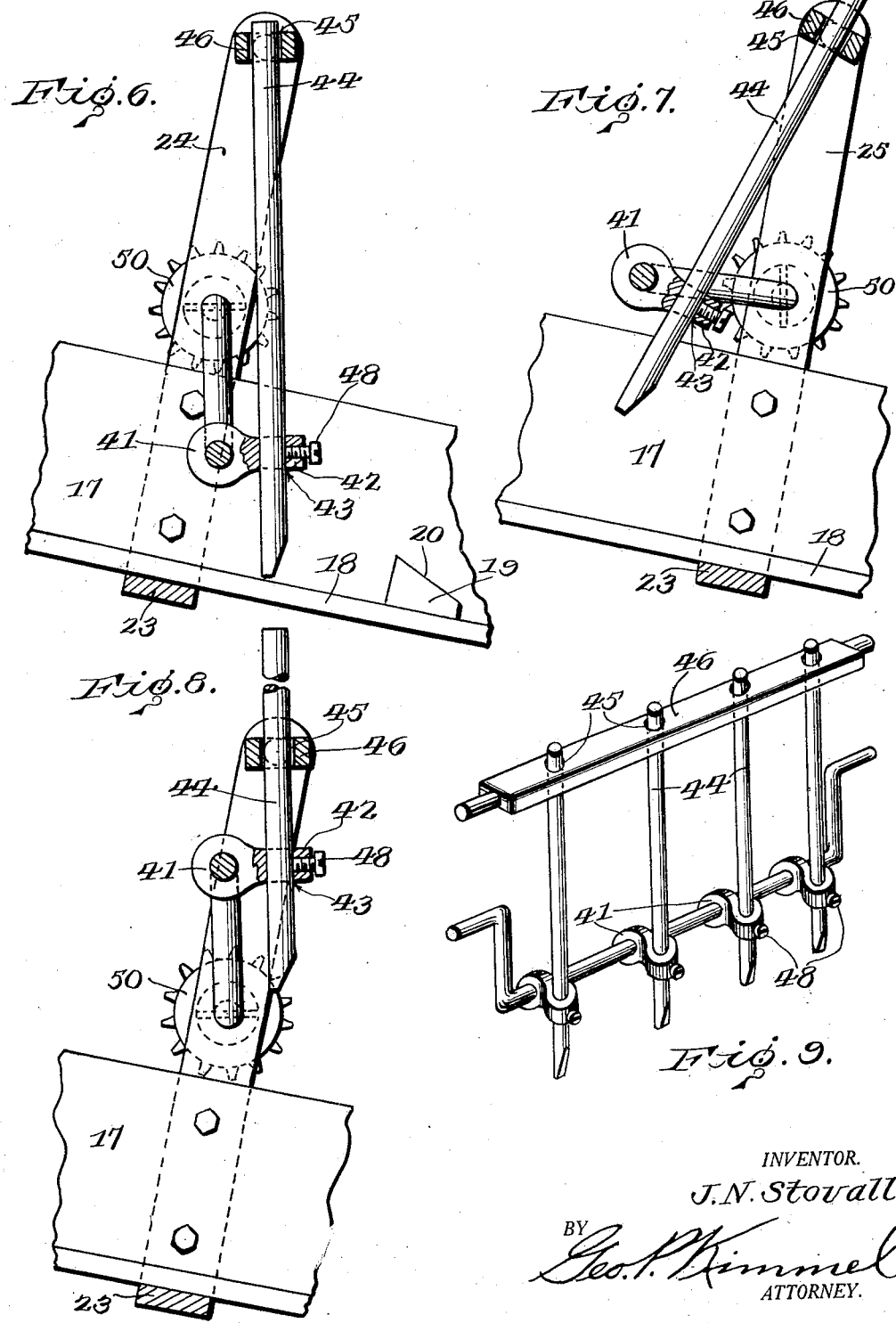
INVENTOR.  
J. N. Stovall  
BY Geo. P. Kimmel  
ATTORNEY.

Patented Mar. 6, 1928.

1,661,976

UNITED STATES PATENT OFFICE.

JAMES N. STOVALL, OF GORMAN, TEXAS, ASSIGNOR OF ONE-FOURTH TO I. C. UNDERWOOD AND ONE-FOURTH TO C. E. HERRINGTON, OF GORMAN, TEXAS.

HARVESTING MACHINE.

Application filed February 21, 1927. Serial No. 169,968.

This invention relates to a peanut harvesting machine, and has for its object to provide, in a manner as hereinafter set forth a machine of such class so constructed and arranged to provide for the digging of peanut vines as well as for cleaning, shocking and piling the vines after being dug, and whereby the digging, cleaning and piling operations are successively and continuously carried out during the travel of the machine, and with the means providing for the digging, cleaning and piling operations driven from the supporting wheels of the machine during the travel of the latter.

Further objects of the invention are to provide, in a manner as hereinafter set forth, a peanut harvesting machine, which is comparatively simple in its construction and arrangement, strong, durable, adjustable, thoroughly efficient in its use, readily assembled and comparatively inexpensive to set up.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference character denote corresponding parts throughout the several views:

Figure 3 is a longitudinal sectional view.

Figure 4 is an elevation looking towards the front end of the machine.

Figure 5 is a fragmentary view, in section, illustrating one of the conveyor elements or reels.

Figures 6, 7 and 8 are fragmentary views in sectional elevation, illustrating various positions of a conveyor element reel.

Figure 9 is a perspective view of a conveyor element or reel.

A peanut harvesting machine, in accordance with this invention, comprises a plow or digger element, a combined vine elevating and sifter element, a series of conveyor elements or reels carried by the combined elevating and sifter element, a combined vine collector and dumper element, a body portion suspending the combined collector and dumper element, a pair of supporting wheels, a revoluble axle common thereto and further providing a support common to said body portion and combined elevating and sifter element, driving means for the conveyor elements carried by the combined elevating and sifter elements and operated from the axle, and adjusting means common to the plow or digger element and said combined elevating and sifter element. The plow or digger element being supported from the forward end of the combined elevator and sifter element, and the latter being arranged within the body portion and having its rear end discharging into the combined collector and dumper element.

Figure 1:
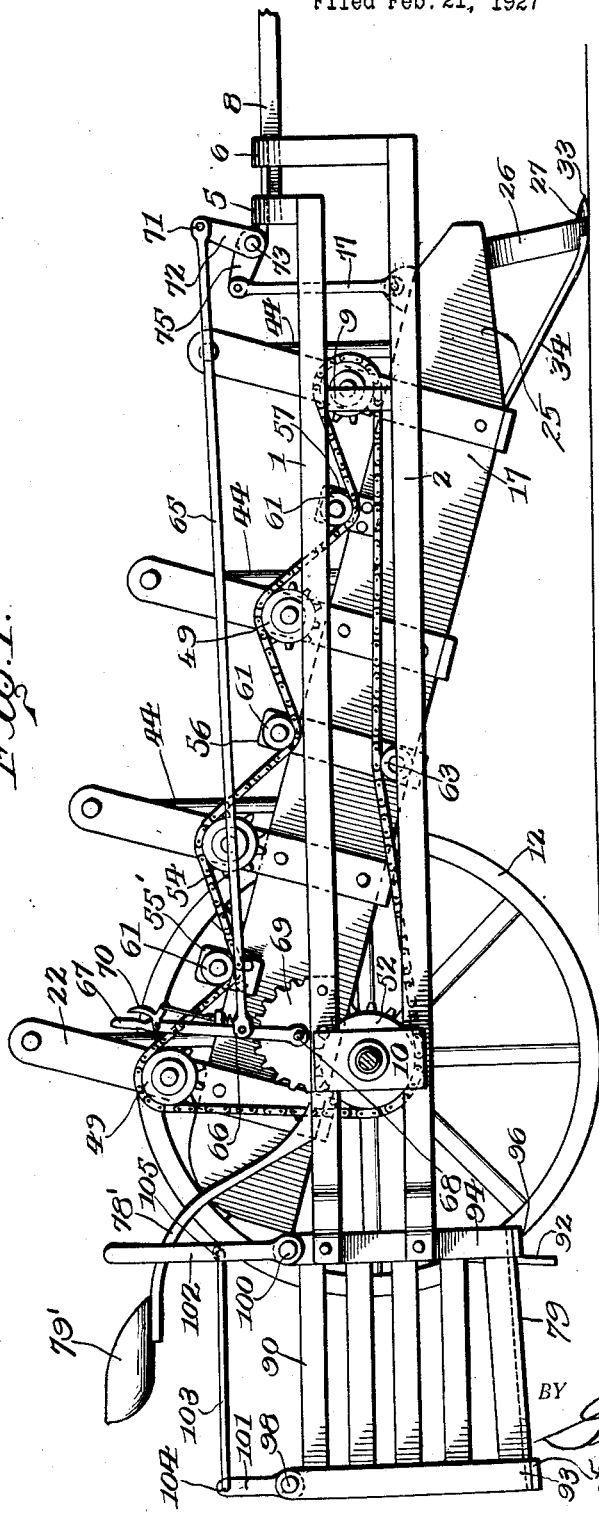
Figure 1 is a side elevation of a peanut harvesting machine in accordance with this invention.

Referring to the drawings in detail the body portion of the machine includes two opposed spaced pairs of longitudinally extending frame bars of appropriate length. One pair of bars being arranged at one side of the machine and the other pair at the other side of the machine. The bars of each pair are arranged in superposed spaced relation. The bars of one pair are indicated at 1, 2, and the bars of the other pair at 3, 4, and with the bars 1, 3 which are the upper bars of said pairs being of less length than the bars 2, 4 which are the lower bars of said pairs. The bars 2, 4 at their forward ends project forwardly from the forward ends of the bars 1, 3. The bars 1, 3 at their forward ends are connected together by a transversely extending arched shaped front bar 5 and the bars 2, 4 at their forward ends are connected together by a transversely extending arched shaped front bar 6. The bar 5 is of less height than the bar 6 and the bar 6 is of a height whereby the top thereof will aline with the top of the bar 5. The bar 5 is spaced rearwardly of and with respect to the bar 6. Secured to the bars 5, 6 centrally thereof, by the holdfast devices 7 is a forwardly directed tongue 8 adapted to be connected to a pulling means for the machine, and the latter can be pulled by horse power or by tractor. Arranged between the bars of each pair, in proximity to their forward ends, is a vertically disposed combined brace and spacing member 9 see Figure 1. Secured to the bars of each pair, in proximity to their rear ends, is a bearing member 10, for a revoluble axle 11 and the latter projects laterally from said bearing elements 10 and has secured to the projecting ends thereof supporting wheels 12, 13, of any suitable diameter. The axle 11 and supporting wheels bodily revolve as a unit. The rear terminal portions of each of the side bars 1, 2, 3 and 4 are inturned, as at 14, and flanged as at 15 and the purpose thereof will be hereinafter more fully referred to.

Figure 2:
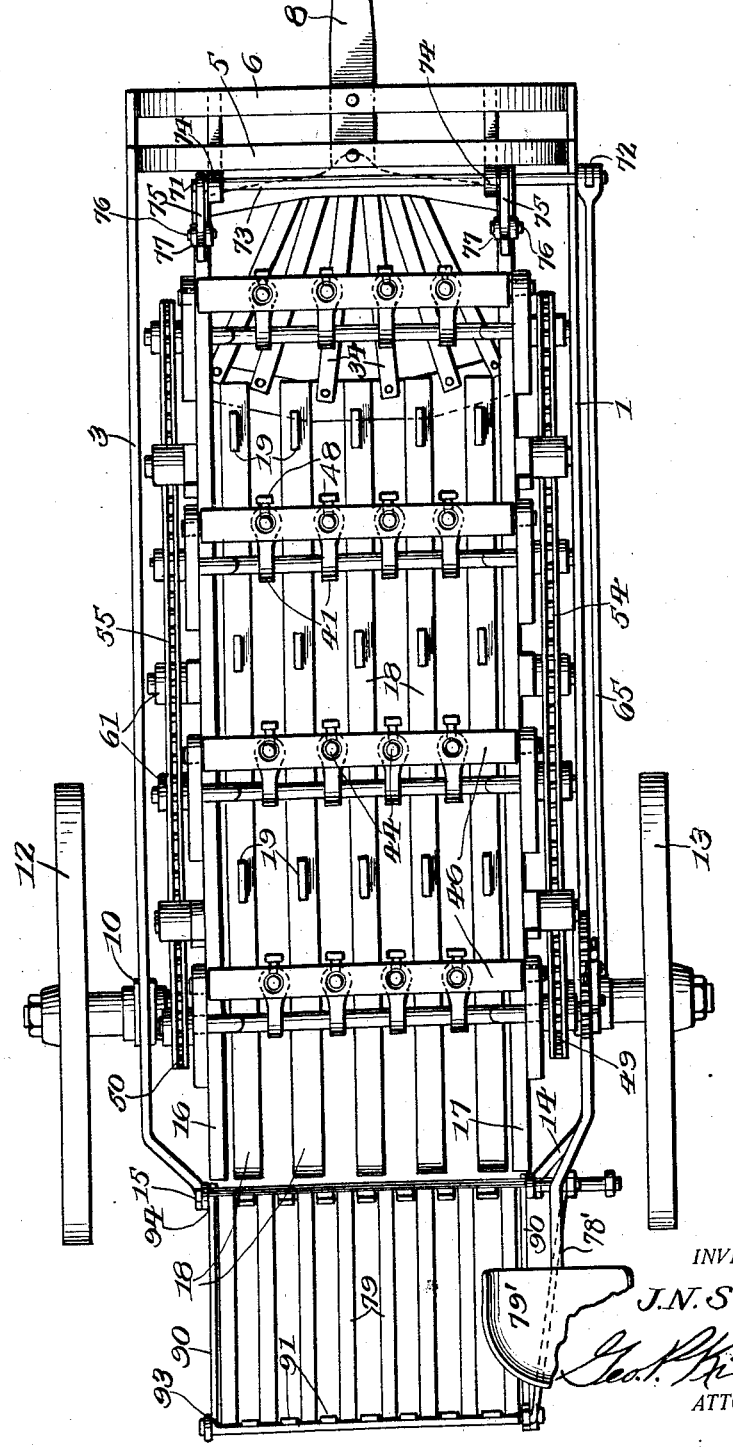
Figure 2 is a top plan view thereof.

The combined vine elevator and sifter element is disposed normally at an inclination and projects forwardly from the axle 11 and further depends downwardly with respect to the latter. The axle 11 is connected to said element in proximity to the upper or rear end of the latter. The said element is open at its forward and at its rear end and comprises a pair of side members 16, 17, a slotted bottom formed of a series of lengthwise extending opposed, spaced flat bars 18, a set of upstanding spaced retarders or holders secured to the upper face of each bar 18 and with each retarder or holder of each set formed of an upstanding lug 19 having an inclined top edge 20 with the inclination of such edge extending downwardly from the forward edge of the lug, depending coupling members 21 secured by the holdfast device 22' to the inner faces of the side members 16, 17 in proximity to the rear ends of these latter and providing means for shiftably connecting or coupling the element to the axle 11, see Figure 3. The element further includes a series of spaced, upstanding U-shaped members 22 which are positioned against the lower face of and extend transversely of the bars 18 and which also are positioned against the outer side faces of and project a substantial distance above the side members 16, 17. The bottom portion of each of the U-shaped members 22 is indicated at 23 and which is fixedly secured against a lower face of the bars 18 and not only provide supporting means for such bars, but further maintain the bars in spaced relation when the bars are connected therewith. The side portions of each U-shaped member, indicated at 24, are fixedly secured to the outer faces of the side members 16, 17. The bottom edge of the side member 16, as well as the side member 17, at the forward terminal portion thereof is upwardly inclined, as indicated at 25 whereby such forward terminal portion is set up of tapered contour. The bottom portion 23 of the forward U-shaped member 22 is of segmental contour as shown in Figure 2. The bars 18 do not project forwardly of the bottom portion 23 of the forward U-shaped member 22. The side portion of the U-shaped members 22 provided supports for the conveyor elements or reels to be presently referred to.

The plow or digger element for the vines is arranged between and depends from the forward end of the combined elevator and sifter element, and the plow or digger element comprises a plow or digger head referred to generally by the reference character 26 and consists of an intermediate portion 27 and a pair of end portions 28, 29. The end portions 28, 29 are of curved contour and project away from the intermediate portion 27, extend upwardly from the latter and in opposite directions with respect to each other. The upper end of each end portion terminates in a head 30. The heads 30 bear against the inner faces of the side members 16, 17 of the combined elevator and sifter element and are fixedly secured therewith by the holdfast devices 31, see figure 3. The end portions 28, 29 depend from the side members 16, 17 and are oppositely curved with respect to each other. The intermediate portion 27 of greater width, in cross section, than either of the end portions 28, 29 and the lower face of the intermediate portion 27 is mortised as at 32. The intermediate portion 27, in cross section, is of convex curvature with respect to its upper face to provide a pointed forward edge 33. The intermediate portion 27 is so set up that it gradually increases in width from its points of joinder with the end portions 28, 29 to its center. The plow or digger member is braced in position by a series of rearwardly extending brace bars 34 which incline away from each other and have their rear ends 35 fixedly secured to the bottom portion 23 of the forward U-shaped member 22 and have this forward ends 36 secured in the mortise 32 of the intermediate portion 27. The brace bars 34 incline downwardly from their rear towards their forward ends. The plow or digger element is bodily carried with the combined elevator and sifter element, as well as being bodily adjusted therewith and the adjusting means which is common to the combined elevator and sifter element and plow or digger element will be presently referred to.

The conveyor elements or reels are arranged in spaced relation with respect to each other, and the number of such reels correspond to the number of U-shaped members 22 and the side portions of these latter support the reels above the slotted bottom of the combined elevator and sifter. As illustrated the machine is shown provided with four reels corresponding in number to the number of U-shaped members 22. As the construction of each of said reels in the same, but one will be described as the description of one will apply to the others. Each reel is revoluble and acts to convey the vines from the lower to the upper or rather from the forward to the rear end of the combined elevator and sifter and as the vines are conducted upwardly by the reels the dirt will be sifted from the vines through the slotted bottom of the combined elevator and sifter. Each reel comprises a revoluble shaft consisting of a U-shaped intermediate portion 37 operating between the side members 16, 17 of the combined conveyor and sifter element. The shaft further includes a pair of end portions 38, 39 which are journaled in and extend from the side portions of the U-shaped member 22. The end portions 38, 39 are oppositely disposed with respect to each other and extend at right angles from and are formed integral with the side portions 40 of the U-shaped portion 37 of the shaft. Carried by the intermediate part of the U-shaped portions 37 of the shaft is a set of collars 41, as illustrated by way of example four in number, and each collar is provided with an extension 42, formed with an opening 43 for the passage of a reciprocatory rake bar or tooth 44 which reciprocates through an opening 45 formed in a guide member 46, having reduced ends 47 for pivotally mounting said guide member in the side portions 24 of a U-shaped member 22, see Figure 5. The number of openings 45 formed in the guide member 46 correspond to the number of rake bars or teeth. Each rake bar or tooth 44 is adjustably secured by the set screw 48 to the extension 42. The set screw 48 is carried by the extension and binds against the rake bar or tooth 44, see Figure 8. The end portion 38, 39 projects from the side portions of the U-shaped member 22 and the end portion 38 carries a sprocket pinion 49 and the end portion 39 carries a sprocket pinion 50. The sprocket pinions 49, 50 are arranged exteriorly of the side portions 24 of the U-shaped member 22. The rake or conveyor bars or teeth 44 operate between the sets of retarders or holders carried by the bottom bars 18 and over the openings or slots 51 formed between the bars 18, see Figure 5. The conveyor elements or reels are synchronously operated and the means for operating them will be presently referred to.

The operating means for the conveyor elements or reels is driven from the axle 11 and the latter is provided inwardly of each bearing member 10, with a sprocket wheel and said wheels are indicated at 52, 53. The wheels 52, 53 are positioned exteriorly with respect to the coupling members 21. Travelling over the sprocket wheel 52 and the sprocket pinions 49 is an endless drive chain 54 and travelling over the sprocket wheels 53 and over the sprocket pinion 50 is an endless drive chain 55. The chains 54, 55 are operated from the sprocket wheels 52, 53 and provide means for synchronously operating the conveyor elements or reels. Secured to the outer face of the side member 17, extending above the same and arranged between the members 22 are supports 55', 56 and 57. The outer face of the side members 16 has secured thereto supports 58, 59 and 60 and which project above said side members 16. The support 56 extends below the side member 17 and the support 59 extends below the side member 16. The support 55' opposes the support 58, the support 56 opposes the support 59 and the support 57 opposes the support 60. Carried by each support 55', 56 and 57 and arranged above the side member 17 is an idler pulley 61. Carried by each support 58, 59 and 60 and arranged above the side member 16 is an idler pulley 62. Carried by the support 56 at the lower end thereof is an idler pulley 63 and carried by the support 59 at the lower end thereof is an idler pulley 64. The chain 54 travels under the idler pulleys 61 and over the idler pulley 63, and the chain 55 travels on the idler pulleys 62 and over the idler pulley 64. From the foregoing construction and arrangement, during the travel of the machine, the chains 54 and 55 will be driven under such conditions synchronously operating the conveyor elements or reels. The action of the conveyor elements or reels will be to force or convey the vines upwardly through the combined elevator and sifter element. As the vines are being conveyed in an upward direction the retarders or holders will prevent the vines from sliding in a direction towards the forward end of the combined elevator and sifter elements. The vines as they are moved upwardly will pass over the bevelled upper ends of the retarders or holders. The adjusting means which is common to the combined elevator and sifter and plow or digger element is operated from one side of the machine and includes a pull bar 65 arranged above the side bar 1 and pivotally connected at its rear end, as at 66, to a shifting lever 67, which is pivotally connected at its lower end, as at 68 to a segmental rack 69 secured against the inner face of the side bar 1. A spring controlled pawl and lever mechanism 70 is carried by the lever 67 and coacts with the rack 69 for the purpose of maintaining the adjusting means in set position. The forward end of the pull bar 65 is pivotally connected as at 71, to a crank arm 72, which extends from a shaft 73, journaled in bearing brackets 74, extended rearwardly, from the rear front bar 5. The shaft 73 is disposed transversely and has one end projecting beyond the side bar 1, see Figure 2. The shaft 73 is provided with a pair of crank arms 75, which are pivotally connected as at 76, to a pair of depending lift bars 77, which are pivotally connected as at 78, to the side members 16 and 17 of the combined elevator and sifter elements, see Figures 1, 2 and 3.

A seat post 78' is secured to the top side bar 1 and extends rearwardly therefrom and is provided at its upper end with a seat 79' for the operator.

The combined vine collector and dumper element is arranged below the upper or rear end of the combined elevator and sifter element and is supported or rather suspended from the side bars of the body portion of the machine. The flanges 15 of the inturned rear terminal portion 14 of the side bars of the body portion are secured to the combined vine collector and dumper element by suitable holdfast devices. The collector and dumper is of skeleton form and includes a bottom formed of a series of spaced slats and indicated at 79, a pair of stationary sides formed of spaced slats indicated at 90, a shiftable rear wall formed of spaced slats 91 and a shiftable forward wall formed of spaced slats 92 of greater length than the slats 91. The slats 90 of each side wall are secured together by a pair of vertically disposed, flat connecting bars 93, 94. The bars 93 of the side walls oppose each other and the bars 94 of the side walls oppose each other. The slats 79 are secured together by flat connecting bars 95, 96 upon which rest the lower ends of the bars 93, 94. The slats 91 are suspended from a rock shaft 97 which is journaled in the upper ends of the bars 93 and extended from one of the bars 93 as indicated at 98. The slats 91 in proximity to their lower ends are connected together by a cross bar 91'. The lower ends of the slats 91 are spaced above the bottom formed by the slats 79 and these latter incline downwardly from the bar 96 to the bar 95. The slats 92 are suspended from a rock shaft 99 which is journaled in the upper ends of the bars 94 and projects laterally from one of said bars as indicated at 100. The slats 92 are of a length to extend below the slats 79 and said slats 92 pass between the slats 79. The hinged rear wall of the collector and dumper provides a hinged gate which is normally in closed position. The hinged forward wall of the collector and dumper provides an ejecting element for discharging the collected vines from the combined collector and ejector. The shaft 97 is provided with a crank arm 101 and the shaft 99 with a lever arm 102. The crank arm 101 is connected with the lever 102 by a link 103 and the latter is pivotally connected as at 104 to the crank arm 101 and as at 105 to the lever 102. The levers 67 and 102 are arranged in convenient reach of the operator, when seated. The collector and dumper also provides means for piling the vines when discharged. The collector and dumper is under control of the operator.

The harvesting machine, as described and shown, will provide for the digging up of the vines, elevating and sifting them, collecting the sifted vines and discharging them in piles, the several operations being successive, but continuous, and therefore it is thought the many advantages of a cleaner and harvesting machine, in accordance with this invention can be readily understood, and although the preferred embodiment of the invention is as illustrated and described, yet it is to be understood that changes in the details of construction can be had which will fall within the scope of the invention as claimed.

What I claim is:

1. A peanut harvester comprising a combined vine elevating and sifter element normally inclining upwardly from front to rear, a vine digger means arranged between and depending from the forward ends of said element, revoluble conveyor reels supported from the sides of and operating within said element, and including reciprocatory conveyor bars bodily traveling in an arcuate path and pivoted guides for the bars, a portable body portion including supporting wheels and shiftably supporting said element from the rear of the latter, operating means for said reels driven from one of said supporting wheels, a combined vine collector and dumper supported from the body portion below the rear end of said element, said element including a slotted bottom, and sets of spaced vine retarders projecting upwardly from said bottom, the retarders of said sets arranged between said bars.

2. In a peanut harvester a combined collector and dumping element, said element being of skeleton form and including a pair of side walls, a bottom connected thereto, a rear wall hinged to the side walls and a forward wall hinged to the side walls, said element open at its top for the reception of the vines and said hinged rear wall providing a closure gate and said hinged forward wall providing an ejector for the vines collected, and means common to said hinged walls for synchronously shifting them in one direction to provide for the dumping of the collected vines.

3. In a peanut harvester a combined collector and dumping element, said element being of skeleton form and including a hinged rear wall and a hinged forward wall, said element open at its top end for the reception of the vines and said hinged rear wall providing a closure gate, said hinged forward wall providing an ejector for the vines collected, means common to said hinged walls for synchronously shifting them in one direction to provide for the dumping of the collected vines, and said hinged forward wall depending below the bottom of said element.

4. In a peanut harvesting machine a plurality of conveyor reels adapted to associate with a vine elevator, said reels arranged in spaced relation and each consisting of a revoluble shaft provided with a U-shaped intermediate portion and a pair of end portions extending in opposite directions with respect to the intermediate portion and formed integral with the sides of the intermediate portion, a plurality of spaced collars carried by said intermediate portion and each formed with an extension provided with an opening, a pivotally supported guide member provided with a plurality of openings, and conveyor teeth extending through the openings of said extensions, adjustably connecting these latter and further reciprocating through the openings in the guide member and an upstanding support common to said shaft and guide.

5. In a peanut harvester a plurality of conveyor reels adapted to associate with a vine elevator, said reels arranged in spaced relation and each consisting of a revoluble shaft provided with a U-shaped intermediate portion and a pair of end portions extending in opposite directions with respect to the intermediate portion and formed integral with the sides of the intermediate portion, a series of spaced collars carried by said intermediate portion and each formed with an extension provided with an opening, a pivoted guide member provided with reduced ends and a plurality of openings, conveyor teeth extending through the openings of said extensions and further reciprocating through the openings in the guide member, means for securing said teeth in said extensions, and a pair of upstanding supports common to the end portions of the shaft and the reduced ends of said member.

In testimony whereof, I affix my signature hereto.

JAMES N. STOVALL.